US008819365B2

(12) United States Patent
Shuster

(10) Patent No.: US 8,819,365 B2
(45) Date of Patent: Aug. 26, 2014

(54) FLEXIBLE DATA STORAGE SYSTEM

(76) Inventor: Gary Stephen Shuster, Fresno, CA (US)

(*) Notice: Subject to any disclaimer, the term of this patent is extended or adjusted under 35 U.S.C. 154(b) by 0 days.

(21) Appl. No.: 13/153,716

(22) Filed: Jun. 6, 2011

(65) Prior Publication Data

US 2011/0238912 A1    Sep. 29, 2011

Related U.S. Application Data

(63) Continuation of application No. 12/111,063, filed on Apr. 28, 2008, now Pat. No. 7,958,303.

(60) Provisional application No. 60/914,671, filed on Apr. 27, 2007.

(51) Int. Cl.
G06F 12/00 (2006.01)
G06F 7/00 (2006.01)

(52) U.S. Cl.
USPC ............. 711/162; 711/202; 711/E12.103; 707/610; 707/656; 707/659

(58) Field of Classification Search
USPC ............. 711/162, 202; 707/610, 656, 659
See application file for complete search history.

(56) References Cited

U.S. PATENT DOCUMENTS

| | | | |
|---|---|---|---|
| 5,392,244 A * | 2/1995 | Jacobson et al. | 711/114 |
| 5,598,549 A | 1/1997 | Rathunde | |
| 5,666,512 A * | 9/1997 | Nelson et al. | 711/114 |
| 5,721,916 A | 2/1998 | Pardikar | |
| 5,790,773 A * | 8/1998 | DeKoning et al. | 714/6.22 |
| 5,845,319 A * | 12/1998 | Yorimitsu | 711/114 |
| 5,974,515 A | 10/1999 | Bachmat et al. | |
| 6,173,413 B1 | 1/2001 | Slaughter et al. | |
| 6,275,898 B1 * | 8/2001 | DeKoning | 711/114 |
| 6,463,504 B1 | 10/2002 | Ishibashi et al. | |
| 6,477,618 B2 | 11/2002 | Chilton | |
| 6,631,477 B1 | 10/2003 | LeCrone et al. | |
| 6,675,176 B1 | 1/2004 | Shinkai et al. | |
| 6,785,788 B1 * | 8/2004 | Sands, III | 711/162 |
| 6,792,473 B2 | 9/2004 | Harnois et al. | |
| 6,807,605 B2 * | 10/2004 | Umberger et al. | 711/114 |
| 6,807,611 B2 * | 10/2004 | Hauck et al. | 711/162 |
| 6,842,834 B2 | 1/2005 | Crockett et al. | |
| 6,868,487 B2 | 3/2005 | Beeston et al. | |
| 6,981,057 B2 | 12/2005 | Theriault et al. | |
| 6,985,995 B2 | 1/2006 | Holland et al. | |
| 7,080,223 B2 | 7/2006 | Dewey | |
| 7,111,113 B2 | 9/2006 | Dahman et al. | |
| 7,165,141 B2 | 1/2007 | Cochran et al. | |

(Continued)

Primary Examiner — Aracelis Ruiz
(74) Attorney, Agent, or Firm — Knobbe Martens Olson & Bear LLP

(57) ABSTRACT

Methods and systems for managing and locating available storage space in a system comprising data files stored in a plurality of storage devices and configured in accordance with various data storage schemes (mirroring, striping and parity-striping). A mapping table associated with each of the plurality of storage devices is used to determine the available locations and amount of available space in the storage devices. The data storage schemes for one or more of the stored data files are changed to a basic storage mode when the size of a new data file configured in accordance with an assigned data storage scheme exceeds the amount of available space. The configured new data file is stored in accordance with the assigned data storage scheme in one or more of the available locations and the locations of the new data file are recorded.

22 Claims, 3 Drawing Sheets

(56) References Cited

U.S. PATENT DOCUMENTS

| | | |
|---|---|---|
| 7,165,160 B2 * | 1/2007 | Kodama .................... 711/169 |
| 7,181,581 B2 | 2/2007 | Burkey |
| 7,322,010 B1 * | 1/2008 | Mikula .................... 715/734 |
| 7,418,548 B2 * | 8/2008 | Corrado et al. ............ 711/114 |
| 7,916,421 B1 * | 3/2011 | Liikanen et al. .......... 360/77.01 |
| 2001/0044879 A1 | 11/2001 | Moulton et al. |
| 2002/0124137 A1 * | 9/2002 | Ulrich et al. ............... 711/113 |
| 2004/0030730 A1 * | 2/2004 | Arai et al. .................. 707/204 |
| 2004/0030831 A1 * | 2/2004 | Patterson et al. ........... 711/117 |
| 2005/0010722 A1 | 1/2005 | Chen |
| 2005/0188169 A1 * | 8/2005 | Fujibayashi ............... 711/170 |
| 2005/0235128 A1 * | 10/2005 | Rustagi et al. ............. 711/170 |
| 2005/0251633 A1 | 11/2005 | Micka et al. |
| 2006/0136661 A1 | 6/2006 | Toshine |
| 2006/0282485 A1 * | 12/2006 | Aggarwal et al. .......... 707/206 |
| 2007/0079068 A1 * | 4/2007 | Draggon ................... 711/114 |
| 2007/0294598 A1 * | 12/2007 | Anderson et al. ........... 714/54 |
| 2007/0300033 A1 * | 12/2007 | Kano ....................... 711/170 |

* cited by examiner

FLEXIBLE DATA STORAGE SYSTEM

CROSS-REFERENCE TO RELATED APPLICATIONS

This application is a continuation of Ser. No. 12/111,063, filed Apr. 28, 2008, now U.S. Pat. No. 7,958,303, which claims priority pursuant to 35 U.S.C. §119(e) to U.S. provisional application Ser. No. 60/914,671 filed Apr. 27, 2007, which applications are specifically incorporated herein, in their entirety, by reference.

FIELD OF THE INVENTION

The present invention relates to data storage, and in particular, to systems and methods for improving the storage, security and access on a data storage system or computer data storage subsystem.

BACKGROUND

Redundant arrays of independent disks, otherwise known as "RAID", refer generally to computer data storage schemes that divide and/or replicate data among multiple hard disk to achieve greater levels of data reliability and increased input/output (I/O) performance. RAID typically requires the use of two or more physical disks which are set up in an array. Depending on the type of RAID level applied, data may be distributed and/or copied across the several disks. The array, however, is seen by the computer user and operating system as a single disk.

The fundamental principle behind RAID is the use of multiple hard disks in an array that behaves in most respects like a single large, fast one. There are a number of ways that this can be done, depending on the needs of the application, but in every case the use of multiple disks allows the resulting storage subsystem to exceed the capacity, data security and/or performance of the disks that make up the system.

There are three key concepts in RAID: (1) mirroring, which refers to copying data to more than one disk; (2) striping, which refers to the splitting of data across more than one disk; and (3) error correction, in which redundant data is stored to allow problems to be detected and possibly fixed. Many different RAID levels are available that utilize one or a combination of these concepts, depending on the system requirements. Thus, each RAID level provides various advantages and disadvantages in protection against data loss, capacity and speed.

The most commonly used RAID configurations are RAID-0, 1 and 5, A RAID 0 (striped set without parity) splits data evenly across two or more disks with no parity information for redundancy. RAID-0 is typically used to increase performance and additional storage space, but because it provides no fault tolerance, it does not provide safeguards for data recovery in the event of disk failure.

A RAID-1 (mirrored set without parity) creates an exact copy or mirror of a data set on two or more disks. A RAID-1 is useful when read performance and reliability are more important than increasing data storage capacity. Moreover, RAID-1 provides fault tolerance from disk errors and single disk failure. One limitation of a RAID-1 configuration is that the memory space can only be as large as the smallest member disk in the array.

A RAID 5 (striped set with distributed parity) uses block-level striping with parity data distributed across all member disks. RAID 5 provides fault tolerance from a single drive failure. Upon drive failure, subsequent reads can be calculated from the distributed parity. In the event of a failure of two drives, data may be lost.

A RAID-6 (striped set with dual parity) uses block-level striping with parity data distributed across all member disks. RAID-6 provides fault tolerance from two drive failures, making larger RAID groups more practical. Whereas single parity RAID levels are vulnerable to data loss until the failed drive is rebuilt, the larger the drive, the longer the rebuild will take. The dual parity provided by RAID-6 gives time to rebuild the array without the data being at risk if one drive fails before the rebuild is complete. RAID-6 has achieved popularity due to its low cost of redundancy as compared to the other RAID levels.

Extant implementations of RAID and other data storage system security, redundancy, backup and acceleration systems suffer from numerous limitations. One such limitation is that the total usable capacity of a RAID array is based on the capacity of the smallest drive in the RAID array. For example, in a RAID-1 array, the data storage capacity can only be as big as the smallest member disk because it requires an exact copy (or mirror) of a set of data on two or more disks. Similarly, in RAID-0 and RAID-5 arrays having disks of differing sizes, the limitation of total usable storage space is also based on the size of the smallest disk.

Another limitation of existing RAID systems is that it often does not discriminate between important critical files from the less critical ones. For example, files existing in trash bins or files which are not critical if lost (i.e., readily reproducible from other sources) generally need not be mirrored, striped or parity striped.

Furthermore, existing RAID systems have proven to be very difficult for the average consumer to understand, configure and utilize. Generally, there is little flexibility as to the selection of the appropriate RAID levels to a particular file once the disks have been configured in a particular RAID array. Therefore, the system cannot easily be adapted or changed to accommodate the user's changing needs with respect to desired performance, security and fault tolerance, and memory capacity of the system on a file-by-file basis.

SUMMARY

Methods and systems are disclosed herein for managing and locating available storage space in a system comprising data files stored in a plurality of storage devices and configured in accordance with various data storage schemes.

In one preferred embodiment, a method for managing available storage space in a plurality of storage devices is provided. The plurality of storage spaces comprise stored data files configured in accordance with one or more data storage schemes.

The method generally comprises determining, by reference to a mapping table, the available locations and amount of available space in the storage devices; changing the data storage schemes for one or more of the stored data files to a basic storage mode when a size of a new data file configured in accordance with an assigned data storage scheme exceeds the amount of available space in the storage devices; storing the new data file configured in accordance with the assigned data storage scheme in one or more of the available locations in the storage devices; and recording the locations of the new data file in the mapping table in each of the plurality of storage devices. The data storage scheme is selected from the group consisting of mirroring, striping and parity-striping.

In accordance with one aspect of the preferred embodiment, the mapping table may be stored in a mirrored manner across each of the plurality of storage devices. Alternatively, the mapping table may be stored in accordance with a simple RAID-1, RAID-5 or RAID-6 (or other fault tolerant RAID level) to provide the redundancy and performance benefits without the extra storage overhead.

In accordance with another aspect of the preferred embodiment, the mapping table may be stored as a stand-alone file which is preferably backed-up on one or more other storage devices in real time.

In accordance with yet another aspect of the preferred embodiment, the method further comprises prompting the user to confirm the step of changing the data storage scheme for the one or more stored data files before the changing step.

In accordance with a further aspect of the preferred embodiment, the method comprises changing the data storage schemes for additional stored data files to the basic storage mode until the size of the new data file configured in accordance with an assigned data storage scheme does not exceed the amount of available space in the storage devices. The mapping table may be updated after each changing step to reflect the changed data storage scheme for the stored data files. The mapping table may also be updated after each storing step to reflect the locations and amount of available space in the plurality of storage devices. The mapping table may be associated with or provided in connection with each of the plurality of storage devices.

In accordance with yet a further aspect of the preferred embodiment, the method further comprises changing the data storage schemes for one or more stored data files to the basic storage mode based on one or more file characteristics. The one or more file characteristics may be any one or more selected from the group consisting of: importance, file type, speed requirements for optimal utilization of files of that type, application[s] with which such file is most frequently accessed, number of persons on a network sharing access to such file, size, bandwidth requirements, frequency of read access, frequency of write access and frequency of file backup. The importance of the file may be identified and/or designated by the user.

In accordance with yet a further aspect of the preferred embodiment, the method further comprises assigning the data storage scheme to the new data file. The data storage scheme may be automatically assigned based desired performance, fault tolerance, and redundancy for the new data file. The user may also be prompted to select and assign the data storage scheme for the new data file.

In accordance with yet a further aspect of the preferred embodiment, the method further comprises configuring a selected file or part of a selected file in accordance with one or more data storage schemes.

In a second preferred embodiment, a dynamic data storage system is provided. The dynamic data storage system comprises a plurality of storage devices; a plurality of data files stored in the storage devices and a mapping table associated with each of the plurality of storage devices, the mapping table comprising locations of data files, fragments and parity information associated with the data files, and locations and amount of available space in the storage devices. The plurality of data files are configured in accordance with one or more of a data storage scheme selected from the group consisting of: striping, mirroring and parity-striping. The data storage scheme for the one or more stored data files is changed to a basic storage mode when a size of a new data file configured in accordance with an assigned data storage scheme exceeds the amount of available space in the storage devices.

In accordance with one aspect of the preferred embodiment, the plurality of storage devices do not have identical available space.

In accordance with another aspect of the preferred embodiment, one or more of the storage devices is located in one or more remotely located device.

In accordance with yet another aspect of the preferred embodiment, the data files are configured in accordance with mirroring comprise an original data file and an identical copy of the original data file. The original data file and the identical copy may be stored on storage devices having different memory capacities.

In accordance with a further aspect of the preferred embodiment, the data files are configured in accordance with striping or parity-striping are segmented into logically sequential data across multiple physical devices. The data files configured in accordance with parity-striping further comprises providing parity bit.

Other objects, features and advantages of the present invention will become apparent to those skilled in the art from the following detailed description.

BRIEF DESCRIPTION OF THE DRAWINGS

Like numerals refer to like parts throughout the several views of the drawings.

DETAILED DESCRIPTION OF EMBODIMENTS OF THE INVENTION

The present disclosure is directed to a data storage management system that utilizes certain basic principles of a RAID system, while avoiding the pitfalls inherent in a RAID system.

Figure 1A:
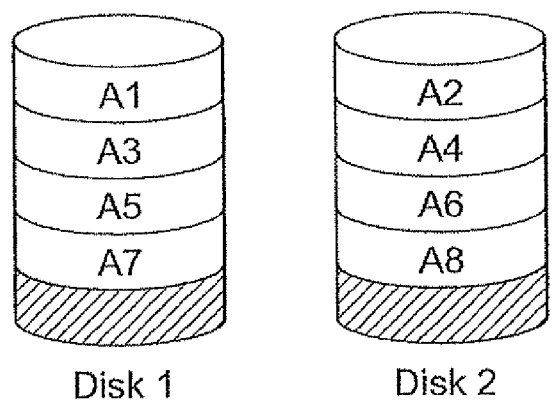
FIGS. 1A-C illustrate the traditional RAID-0, RAID-1 and RAID-5 storage arrangements, respectively.

FIG. 1A depicts a traditional RAID-0 system comprising two hard disks (Disks 1 and 2). In a RAID-0 array, data is written and read in an accelerated manner as reads and writes are spread over two or more drives. In accordance with the RAID-0 system in FIG. 1A, a data file is split into blocks (A1, A2, A3, A4, . . . , A8) and written evenly across two disks, with the odd blocks written to Disk 1 and the even blocks written to Disk 2. A RAID-0 array suffers the disadvantage of not providing any data redundancy. Moreover, although a RAID-0 may be created with disks of differing sizes, the storage space added to the array by each disk is necessarily limited to the size of the smallest disk. For example, if a 120 GB disk is striped together with a 100 GB disk, the size of the array will be 200 GB.

Figure 1B:
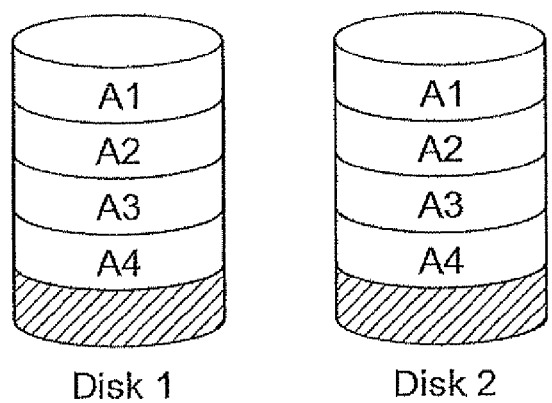

FIG. 1B depicts a traditional RAID-1 storage arrangement comprising two hard disks (Disks 1 and 2). In a RAID-1 arrangement, an exact copy or mirror of a set of data (A1, A2, A3, and A4) is provided on two or more disks. RAID-1 is typically used to improve data security by writing identical copies of data to two different storage devices and then reading such data from the storage devices in parts so that, for example, every odd numbered request is read from Disk 1 and every even numbered request is read from Disk 2. Simple mirroring can also be utilized where reads are all performed from the same disk. Such an arrangement is desirable when read performance and reliability are more important that data storage capacity. For example, RAID-1 configurations may be appropriate for critical data files which are frequently accessed. However, again, a RAID-1 arrangement suffers the limitation in that the array can only be as big as the smallest member disk. For example, to achieve a 100-GB RAID-1 storage device, two separate 100-GB storage devices are required.

Figure 1C:
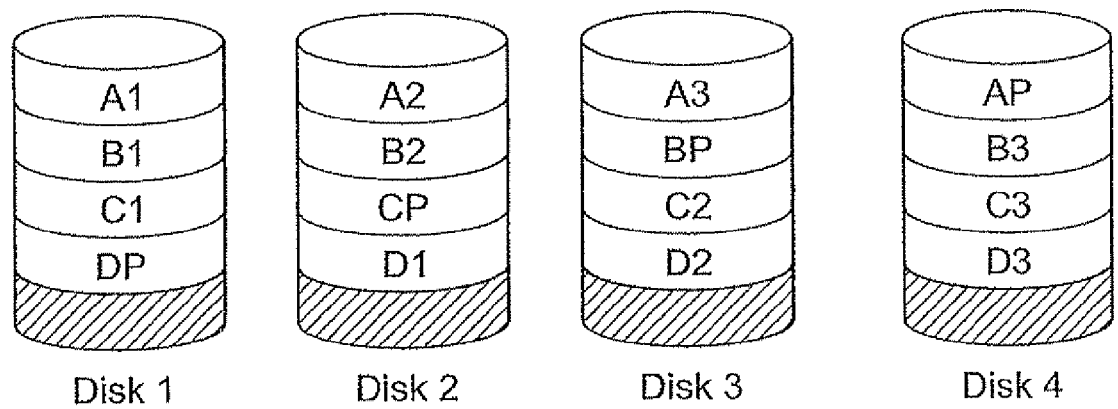

FIG. 1C depicts a traditional RAID-5 storage arrangement comprising four hard disks. A RAID-5 may be understood as an implementation of RAID-1, wherein a striped array of two or more storage devices is supplemented with an additional storage device on which parity data is stored. In the event of a loss of any one of the storage devices, parity data can be used to recreate the lost data. FIG. 1C depicts a concurrent series of blocks (one on each of the disks in an array), which are collectively called "stripes"—i.e., A1, A2, and A3 and a parity byte is provided as Ap. If another block, or some portion of a block, is written on that same stripe, the parity block, or some portion thereof, is recalculated and rewritten. Thus, the calculations required to generate the parity byte make RAID-5 slower and/or more computationally intensive than a RAID-0 or RAID-1 configuration. In a RAID-5, the disk used for the parity block is staggered from one stripe to the next, hence the term "distributed parity blocks." RAID-5 writes are expensive in terms of disk operations and traffic between the disks and the controller. Also, the available storage space in a RAID-5 configuration is based on the capacity of the smallest array (N−1)*s, where N is the number of disks and s is the capacity of the smallest drive in the array. Because of the parity information, a minimum of 3 disks is generally required for a complete RAID-5 configuration.

Unlike traditional RAID systems, the data storage management systems disclosed herein do not require a set of disks to be arrayed or configured in an identical manner. For example, two hard disks, each having 100 gigabytes (GB), configured as a RAID-1 configuration would only have 100 GB of available space, not a combined 200 GB. If additional space were desired, the only option would be to break the entire RAID-1 configuration to lose all mirroring redundancy before the extra 100 GB could be recovered as available disk space.

The data storage management system disclosed herein avoids the need for such a drastic change in order to free up additional memory. Different data storage schemes (i.e., mirroring, striping, or parity-striping) may be applied and removed from files, based on preset rules and/or user preferences. For example, if a user begins to run out of storage space, the system (with optional permission from or notice to the user) may automatically change the RAID status of certain selected files to make additional space for the storage of new data files.

Thus, in one embodiment, while there is plenty of room, the data storage system may be configured to mirror, stripe or parity-stripe all files so that the speed and/or redundancy benefits of RAID are used for all files. When additional storage space is needed, the system may change, for example, the mirrored files which are non-critical, such as mp3 files that are regularly synchronized with an MP3 player, to a basic storage mode wherein the data file is saved in a single storage device or disk. In this manner, the system optimizes the benefits of utilizing the various data storage schemes so long as there is sufficient space in the storage devices and changing the data storage schemes to a basic storage mode as space for additional data files becomes needed.

Thus, the embodiments disclosed herein provide a file system that imitates a RAID system insofar as necessary to deliver the benefits of a RAID system but while utilizing the flexibility of a file system in order to dynamically change the RAID status of the individual files and therefore the memory capacity of the entire system.

Figure 2:
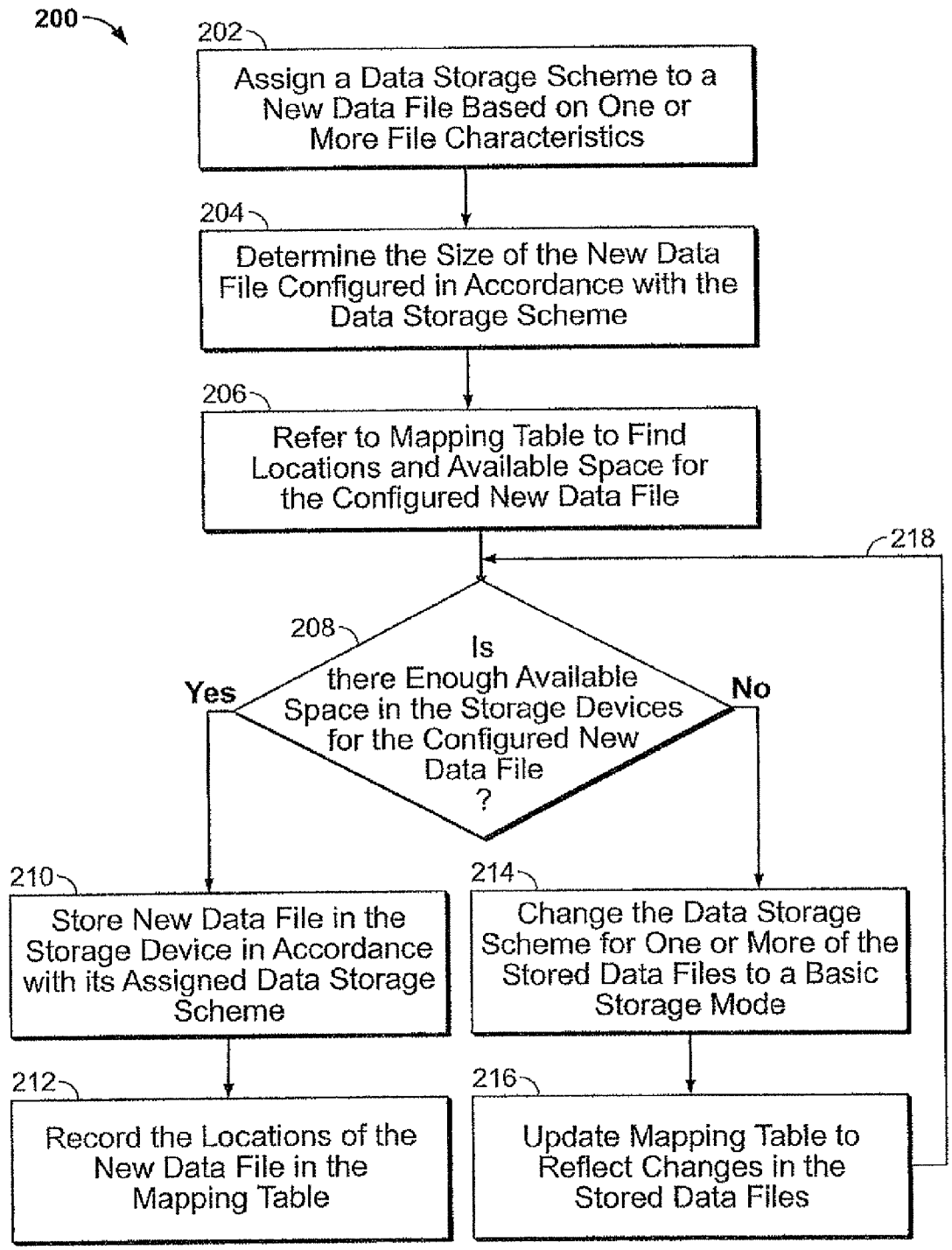
FIG. 2 is a flow chart showing the steps performed by the data storage management system in accordance with one embodiment.

FIG. 2 is a flow chart 200 showing the steps performed by the data storage management system in accordance with one embodiment.

A data storage scheme, such as mirroring, striping, or parity-striping, may be assigned to a new data file based on one or more file characteristics 202. These file characteristics may be based on the desired properties of the data file once stored in the storage devices, such as performance, redundancy, fault tolerance, or a combination of both.

For example, a mirroring data storage scheme might be most appropriate for data files which are considered critical, whereas a striping data storage scheme might be appropriate for less critical data files for which an improved I/O performance is desired. Where both some degree of fault tolerance, redundancy and performance is desired for the data file, a striped-parity data storage scheme may also be appropriate.

Alternatively, the file characteristics may be based on a user's selection of the data storage scheme on a file-by-file basis. In accordance with these embodiments, the system may further include a means by which the user is prompted to select any one of the data storage scheme, i.e., mirroring, parity or parity-striping, for each new data file that is created. The system may further optionally include a message indicating the available space remaining in the storage devices. This will enable the user to better manage the available space remaining in the storage devices.

Once a data storage scheme is assigned to the new data file, the size of the new data file configured in accordance with the data storage scheme is determined 204. The size of the new data file will differ based on the data storage scheme according to which it is configured. For example, a mirrored data file may require twice the storage capacity of the original data file and a parity-striped data file will require the storage capacity of the original file plus the additional storage space required to store the parity data.

The locations and available space for the configured new data file may be looked up using a mapping table 206. In contrast to traditional RAID arrays, the system utilizes mapping tables or records to locate available space in the storage devices in which to store the data file. The mapping table may contain information relating to the locations of data files, fragments and parity information associated with the data files, and locations and amount of available space in the storage devices. Thus, the mapping system may be employed so that the system can determine the locations on the storage devices for each file and its mirror or striped or parity counterparts. The mapping information may be mirrored onto each drive such that, in the event of a drive failure, the data files may be located and possibly recovered using one of the data storage schemes.

The system then determines whether there is enough available space in the storage devices for the configured new data file 208. If enough storage space exists on the storage devices, the new data file may be stored in the storage device in accordance with its assigned data storage scheme and in available spaces in the storage devices as identified by the mapping table 210. The mapping table may then be updated to reflect the new data file saved in the storage device. Specifically, information relating to the locations of the new data file, fragments and parity information associated with the new data files and the locations and amount of available space in the storage devices may be updated in the mapping table 212.

If the system determines that there is insufficient available space in the storage devices for the configured new data file, the data storage scheme for one or more of the stored data files may be converted or changed to a basic storage mode 214. In the basic storage mode, the data file is generally stored on a single disk, without mirroring, striping or parity-striping counterparts, and thus requires the less memory space than a data file that is configured in accordance with one or more of the data storage schemes. The conversion of data storage schemes to the basic storage mode will free up additional memory space in the storage devices for the new data files.

In one embodiment, mirrored data files are selected for conversion into the basic storage mode, since the mirrored data files take up twice the amount of storage space of data files stored in basic storage mode. The system may automatically select mirrored data files for conversion into the basic storage mode based on file usage patterns. For example, the system may select for conversion mirrored data files which are subject to frequent back-ups or synchronization with external devices, such as MP3 player. The system may also automatically select mirrored data files which the user has identified as "non-critical." Such identification may be made by the user at the time the user saves the data file or at some time thereafter, when the system detects that the available remaining space is low or when the system has determined that there is insufficient available space in the storage devices for the configured new data files.

In another embodiment, no user intervention is required to convert stored data files into the basic storage mode. The system may utilize a series of rules, which may be user-defined, programmically determined, fixed by the manufacturer or a combination thereof, to determine which data storage schemes to assign to new or even stored data files when there is available storage space or which to remove from such status as additional storage space is required. In a preferred implementation of this embodiment, the user would be given the ability to define the rules for such determination, with sufficient granularity, that specified files may be identified.

For example, files that are always or almost always reproducible may be striped across all drives without redundancy. Such files include a cache file designed to simply speed up browsing or a memory swap file. Similarly, temporary files used by applications, such video editing software are good candidates for striping. In contrast, critical data files are the worst candidates for a striping data storage scheme. Such files should generally be assigned a mirroring data storage scheme.

The mapping table is updated after each data file is converted to the basic storage mode. The mapping table may be queried after each update to determine whether sufficient space is available in the storage device for the configured new data file. This loop may be repeated 218 until sufficient space is freed up for the configured new data file until sufficient space is freed up on the storage devices to store the new data file.

Figure 3:
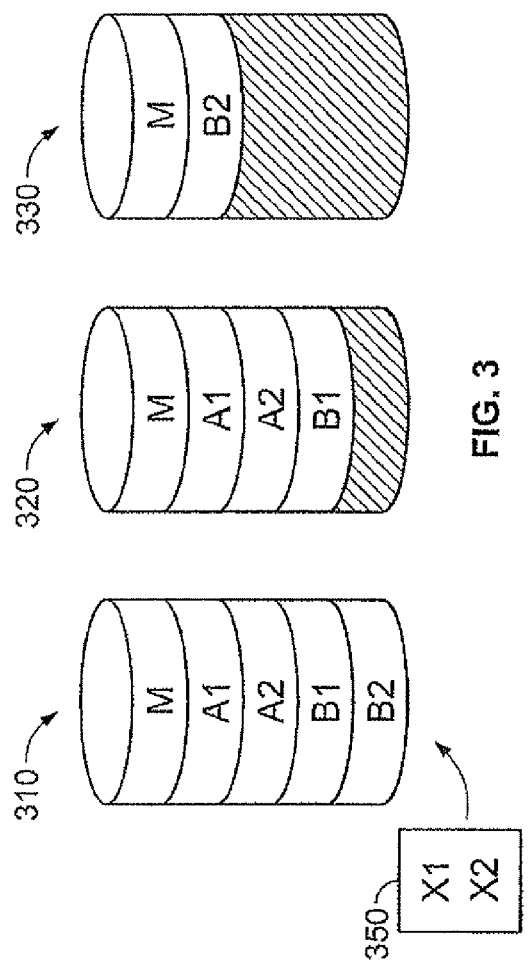
FIG. 3 illustrates a plurality of storage devices in accordance with an embodiment of the flexible data storage system.

FIG. 3 depicts three storage devices 310, 320 and 330, comprising two sets of mirrored data files (A1, A2) and (B1, B2). As shown in FIG. 3, the storage devices 310, 320 and 330 each have different size capacities, e.g., 100 GB, 80 GB and 40 GB, respectively, and are therefore distinct from a traditional mirrored RAID-1 array. The storage devices 310, 320 and 330 each comprise a mapping table M that is mirrored across the storage devices. Mapping table M provides information as to the locations of the data blocks (A1, A2, B1, B2, etc.) such that the system may ascertain their locations on the storage devices. The use of the mapping table M allows data files to be mirrored across storage devices wherever available space may be found. Thus, unlike the traditional RAID-1 array, the available space for data files is not limited to the size of the smallest storage device.

The three storage devices 310, 320 and 330 are depicted as being completely full and as not having available storage space for new data file 350. If the new data file 350 is assigned a mirroring data storage scheme, it will require at least four blocks of available disk space. This may be accomplished by removing the mirrored copies of the stored data files A1 and A2 on storage device 320 and the mirrored copies of the stored data files B1 and B2 on storage device 320 and 330. Thus, in order for the new data file 350 in accordance with a mirrored data storage scheme, for example, the data storage scheme for the stored data files (A1, A2) and (B1, B2) may be converted from the mirrored data storage scheme to a basic storage mode.

Figure 4:
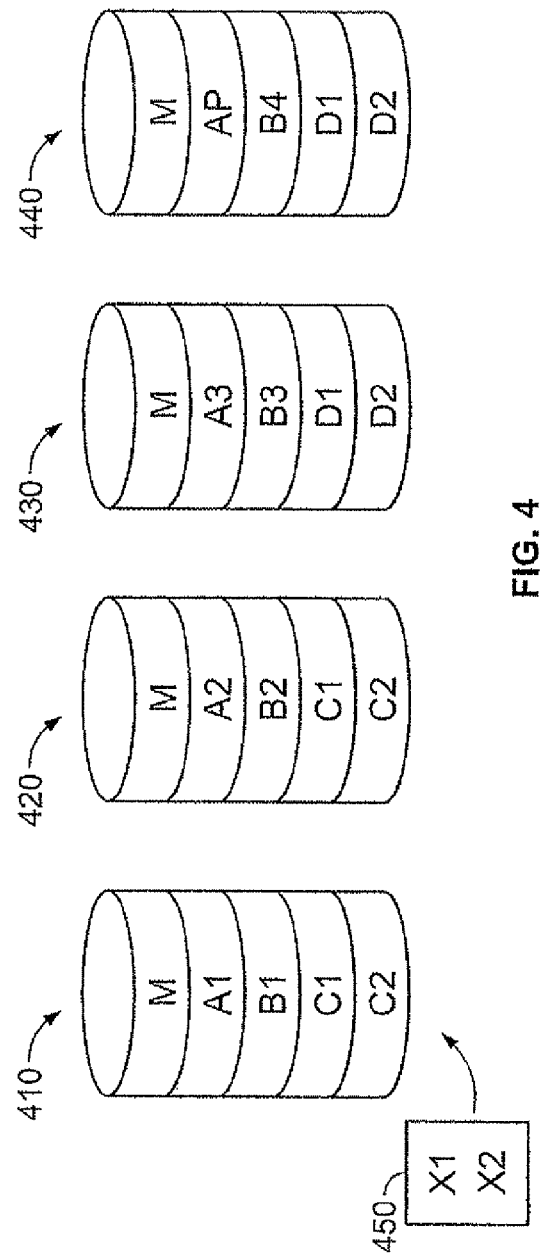
FIG. 4 illustrates a plurality of storage devices in accordance with another embodiment of the flexible data storage system.

FIG. 4 illustrates four storage devices 410, 420, 430, and 440 in accordance with another embodiment of the flexible data storage system. In the example shown in FIG. 4, the storage devices contain stored data files which have been parity-striped (A1, A2, A3, and Ap), striped (B1, B2, B3, and B4) and mirrored (C1, C2 and D1, D2). As with the storage devices depicted in FIG. 2, each of the four storage devices 410, 420, 430, and 440 comprise a mapping table M that is mirrored across the storage devices. A new data file 450 may be saved by changing or converting the data storage scheme of the stored data files (C1, C2) and (D1, D2) from the mirrored data storage scheme to a basic storage mode. If the new data file 450 is assigned a mirroring data storage scheme, it will require at least four blocks of available disk space. This may be accomplished by removing the mirrored copies of the stored data files C1 and C2 on storage devices 410 or 420 and the mirrored copies of the stored data files D1 and D2 on storage device 430 or 440.

It is understood that, unlike the traditional RAID arrays, the storage devices are not considered to be part of a RAID volume but rather the files are treated in a manner that is makes it a virtualized RAID volume. For example, in a traditional RAID-1 in a two drive configuration, everything on drive 1 would be mapped to precisely the same place on drive 2. In contrast, there is no requirement that the physical disk sectors be contiguous or that they correspond to the physical storage sequence or location on the other disk. For example, assuming that the striping is done in 1024 byte blocks, which blocks correspond in a preferred embodiment to physical drive sector size, the mapping table may provide, for example, that "block 1 found on disk 1, sector 12345," "block 2 found on disk 2 sector 93939," and so forth.

Files may also be partially striped, mirrored or parity-striped. For example, if there is insufficient space on disk 1 to stripe a file, the system may use the available space on disk 1 to stripe a part of the file and store the remaining parts of the file in a non-striped manner on disk 2. The mapping table may be referred to in determining the location of each piece of data from which it may be retrieved by the operating system.

In accordance with another embodiment, data files may be shared and distributed within a networked environment. Within a networked environment, the system may read the network speed and drive speeds to determine whether it would be appropriate to utilize networked located storage devices within the system described herein. Thus, for example, a gigabit network with a fast 500-GB drive located on a remote computer may be used for a mirroring data storage scheme. The system may monitor the data transfer speeds and read data only from the local storage devices if the networked storage device is slowing down data reads. The system may preferentially identify networked devices as storage targets based upon their ability to provide the data to users who also share such data. For example, a user who frequently shares a specified file might find that the system has placed a mirrored data file on the user's desktop hard drive.

It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A data storage system comprising:
    a first storage device configured for storing a first data segment;
    a second storage device configured for mirroring the first data segment stored in the first storage device;
    a data structure encoding locations of data segments in the first and the second storage devices in a memory operatively coupled to at least one of the first and the second storage devices; and
    a controller operatively coupled to the first and the second storage devices and configured to determine data segments to mirror on the second storage device based on synchronization settings of respective data segments, wherein the controller is further configured to mirror data segments to the second storage device based on their respective synchronization settings indicating that the respective data segments are not copied to or from a third storage device.

2. The system of claim 1, wherein the first and the second storage devices do not have identical available space.

3. The system of claim 1, wherein one of the first or the second storage devices is located in one or more remotely located device.

4. The system of claim 1, wherein the controller is further configured to update the mapping table with locations of the one or more stored data segments in the first or the second storage devices.

5. The system of claim 1, wherein the controller is further configured to determine data segments to mirror on the second storage device based on file usage patterns.

6. The system of claim 1, wherein the controller is further configured to determine data segments to mirror on the second storage device based on files designated non-critical by a user.

7. The data storage system of claim 1, wherein the synchronization setting of respective data segments comprises a setting that indicates whether the respective data segments are identified for copying to or from a third storage device.

8. The data storage system of claim 1, wherein the synchronization setting of respective data segments comprises a setting that indicates whether the respective data segments have been copied to or from a third storage device.

9. The data storage system of claim 1, wherein the controller is operatively coupled to the first and the second storage devices via a network.

10. The data storage system of claim 1, wherein the first and second storage devices are located in a single computer.

11. The data storage system of claim 1, wherein a third storage device where the determined data segments are mirrored is accessed over a network.

12. A data storage method comprising:
    storing a plurality of data segments in a first storage device;
    selectively copying data segments of the plurality of data segments to a second storage device based on synchronization settings of respective data segments, wherein synchronization settings indicate whether the respective data segments are copied to or from a third storage device or are scheduled to be copied to or from the third storage device; and
    storing locations of data segments in the first storage device and the second storage device in a computer memory.

13. The method of claim 12, wherein the first and the second storage devices do not have identical available space.

14. The method of claim 12, wherein one of the first or the second storage devices is located in one or more remotely located device.

15. The method of claim 12, wherein data segments are selected for copying to the second storage device based on file usage patterns.

16. The method of claim 12, wherein data segments are selected for copying to the second storage device based on files designated non-critical by a user.

17. The data storage method of claim 12, wherein the first and second storage devices are located in a single computer.

18. The data storage method of claim 12, wherein the third storage device is accessed over a network.

19. The data storage method of claim 12, further comprising selectively copying the respective data segments to the second storage device based on their respective synchronization settings indicating that the respective data segments are not copied to the third storage device.

20. Non-transitory physical computer storage comprising computer-executable instructions that, when executed by a computing system, are configured to:
    store a plurality of data segments in a first storage device;
    selectively copy data segments of the plurality of data segments to a second storage device based on synchronization settings of respective data segments, wherein synchronization settings indicate whether the respective data segments are copied to or from a third storage device or are scheduled to be copied to or from the third storage device; and
    store locations of data segments in the first storage device and the second storage device in a computer memory.

21. The non-transitory physical computer storage of claim 20, wherein one of the first or the second storage devices is located in one or more remotely located device.

22. The non-transitory physical computer storage of claim 20, wherein the third storage device is accessed over a network.

* * * * *